US005592241A

United States Patent [19]
Kita et al.

[11] Patent Number: 5,592,241
[45] Date of Patent: Jan. 7, 1997

[54] ATTACHABLE PROTECTIVE SCREEN FOR IMAGE DISPLAY DEVICE AND INSTALLATION METHOD THEREFOR

[75] Inventors: Tetsuya Kita, Kanagawa; Makoto Koizumi, Tokyo, both of Japan

[73] Assignee: Sony Corporation, Tokyo, Japan

[21] Appl. No.: 419,944

[22] Filed: Apr. 11, 1995

[30] Foreign Application Priority Data

Apr. 18, 1994 [JP] Japan ................................. 6-078256
Sep. 8, 1994 [JP] Japan ................................. 6-214149

[51] Int. Cl.⁶ ............................................. H04N 5/65
[52] U.S. Cl. ........................... 348/823; 348/834; 348/842
[58] Field of Search ................................. 348/818, 823, 348/832–835, 841–842; 313/402, 407, 408; 359/609, 611; H04N 5/65

[56] References Cited

U.S. PATENT DOCUMENTS

| | | | |
|---|---|---|---|
| 4,788,597 | 11/1988 | Gart et al. | 348/835 |
| 4,907,090 | 3/1990 | Ananian | 348/823 |
| 5,074,644 | 12/1991 | Hirai et al. | 348/823 |
| 5,155,627 | 10/1992 | Keehn et al. | 348/834 |
| 5,227,916 | 7/1993 | Theirl et al. | 348/835 |

*Primary Examiner*—Kim Vu
*Attorney, Agent, or Firm*—Ronald P. Kananen

[57] ABSTRACT

An image display device incorporating a screen protection arrangement includes a screen frame mounted so as to peripherally surround a display screen of the device. A protector screen is provided which has a width dimension which is substantially equal to that of the screen frame. The screen protection arrangement further includes an insertion space provided within an upper side of the screen frame for accomodating an upper side of the protector screen and one or more base support portions which may be removably installed along a lower edge of the screen frame in a supporting space defined between an inner side thereof and a facing surface of the display screen. A predetermined proportional relationship between width dimensions of the upper insertion space and the lower supporting space are established in consideration of a thickness dimension of the protector screen such that the protector screen may easily be installed or removed from the image display device. In addition, structure of the screen frame allows the vertical dimension of the protector screen to be substantially larger than that of the display screen without hindrance. Thus identical protector screens may be utilized on image display devices of a variety of different makes and models.

8 Claims, 11 Drawing Sheets

ATTACHABLE PROTECTIVE SCREEN FOR IMAGE DISPLAY DEVICE AND INSTALLATION METHOD THEREFOR

BACKGROUND OF THE INVENTION

1. Field of the Invention

The present invention relates generally to a protector screen which is installable over an image display such as a CRT (cathode ray tube), LCD (liquid crystal display), rear projection screen or other type of image display surface.

2. Description of the Related Art

Projection televisions are commonly fitted with a protector screen attached over the projection screen for protecting the imaging surface as well as for enhancing image contrast. Such a conventional type of projector screen as installed over a projection television screen in shown in FIG. 12.

As seen in FIG. 12, the projection television has a case 1 with a substantially open front face. A screen 3 is installed over the front opening of the case 1. The screen 3 is mounted via a screen frame 4 which includes a rectangular screen edge cover 4b having fastening material 20 provided on upper, lower, left and right sides of the screen cover 4b.

A protector screen 10 is utilized which is formed as a flat transparent panel which may be tinted, polarized, or the like. At peripheral edges of a rear surface of the protector screen 10, a fastening material 21 is provided corresponding to the fastening material 20 on the front surface of the screen edge cover 4b of the screen frame 4.

The fastening materials 20, 21 as utilized in such conventional arrangements may be comprised of paired elongate strips of mutally adhesive material which easily attached and detached from one another (i.e. Velcro (™), Luteflocking hook arrangements, etc.). That is, each strip of fastening material 20 affixed to the front edge surfaces of the screen frame 4 is matched with a corresponding strip of fastening material 21 provided on the peripheral edges of the inner surface of the proctector screen 10. Appropriate mounting of the protector screen 10 is achieved when the fastening material strips 21 of the protector screen 10 are positionally aligned with the fastening material strips of the screen frame 4 and engaged therewith. Thus, such a screen protector may 10 be easily installed on an image display device such as a projection television.

Such conventional screen protection arrangements for image display devices have been proposed for example, in Japanese Patent Application First Publication No. 05-023095 filed on Feb. 12, 1993 and commonly assigned to the assignee of the present invention (corresponding U.S. application still pending). In addition, another such screen protector arrangement has been disclosed in U.S. Pat. No. 4,907,090.

A distinguishing feature of such conventional screen protector arrangements as noted above is that the flat panel screen protector is detachably installed on an outer surface of an edge covering portion of a frame of the image display screen. However, the degree of ease and reliability by which installation and/or detachment of the screen protector portion may be effected relies heavily on the matched strips of fastening material 20, 21. Thus, for some users, the utility of such a fastening arrangement is compromised due to drawbacks associated with the fastening means.

For example, problems which are often inherent in such paired fastening materials may include; difficulty of separation, adherence of dust, lint or airborne particles thereto, and there is also the possibility that the strips of fastening material themselves may peel or become dislodged from the surfaces to which they are attached.

It must also be considered that a screen protector which attaches directly to a front surface of a screen frame or edge cover may be temporarily removed by the user from time to time in the course of normal use (i.e. cleaning, etc.). Given this situation another drawback arises in that such conventional screen protection arrangements do not provide means for assuring precise realignment of the screen protector when reattached. Thus the user must reattach the screen protector 'by eye', that is, the strips of fastening material on the screen protector must be visually aligned with those of the screen frame to assure suitable positioning of the screen protector. A manual operation such as this can be quite troublesome physically for some users. For example, even if the screen protector has been adequately reattached from a functional standpoint, achieving a desirable positioning thereof which is symmetrical in relation to the edges of the screen frame on which the protector is mounted, cannot be consistently assured. Thus some may consider that the overall esthetic appearance of the image display device itself has become flawed and/or 'unfinished' looking.

Further, a conventional screen protector arrangement must be manufactured and assembled with regard to the particular make and/or mode of the image display device for which it is intended. Thus the overall costs and laborer for providing such arrangements becomes relatively high.

Accordingly, it has been required to provide an image display device with means for protecting a screen thereof, i.e. a screen protector for an image display device such as projection televisions etc., which can be easily attached and removed with consistent positioning and attractive appearance.

Further, it is desirable to provide a versatile protector screen arrangement which, for example, may be easily utilized over a range of various types and models of image display device without modification.

SUMMARY OF THE INVENTION

It is therefore a principal object of the present invention to overcome the drawbacks of the related art.

It is a further object of the present invention to provide an image display device including a screen protector which can be easily attached and removed with consistent positioning and attractive appearance.

It is also an object of the invention to provide a protector screen arrangement having a high degree of flexibility and general utility such that the same arrangement may be easily installed and utilized with image display devices of various makes or models, without substantial modification.

In order to accomplish the aforementioned and other objects, there is provided an image display device incorporating screen protection means, comprising: a device housing; display means including a display screen installed in a wall portion of the device housing; a screen frame attached to the device housing so as to overlap peripheral edges of the display screen to define a frame opening bordering the display screen; a base support portion provided on the image display device at a location corresponding to a lower edge of the screen frame, the base support portion defining a concave support groove along the lower edge of the screen frame; and a protector screen having a width dimension substantially equal to a width dimension of the frame opening and a vertical dimension greater than a vertical dimension of the frame opening; wherein: a structure of the screen frame is established such that an insertion space is defined within an upper side of the screen frame and a gap is defined between facing surfaces of the upper side of the screen frame and a surface of the display screen; and wherein the insertion space having an upper clearance established such that the protector screen may be upwardly inserted thereinto to a point whereat a lower side of the protector screen achieves a position higher than a front wall of the base support portion.

According to another aspect of the invention, there is provided a method of installing a protector screen on an image display device, comprising the steps of: installing a display screen in a wall portion of a housing; attaching a screen frame to the housing so as to overlap peripheral edges of the display screen to define a frame opening bordering the display screen; providing a base support portion on the image display device at a location corresponding to a lower edge of the screen frame so as to define a concave support groove along the lower edge of the screen frame; upwardly inserting a protector screen, having a width dimension substantially equal to a width dimension of the frame opening and a vertical dimension greater than a vertical dimension of the frame opening into a clearance defined in an upper side of the screen frame, until a lower side of the protector screen is positioned above the base support portion; and fitting the lower side of the protector screen into the concave support groove.

DESCRIPTION OF THE PREFERRED EMBODIMENTS

Referring to the accompanying drawings, particularly FIGS. 1–4, the first preferred embodiment of the invention will be described hereinbelow in detail.

Figure 1:
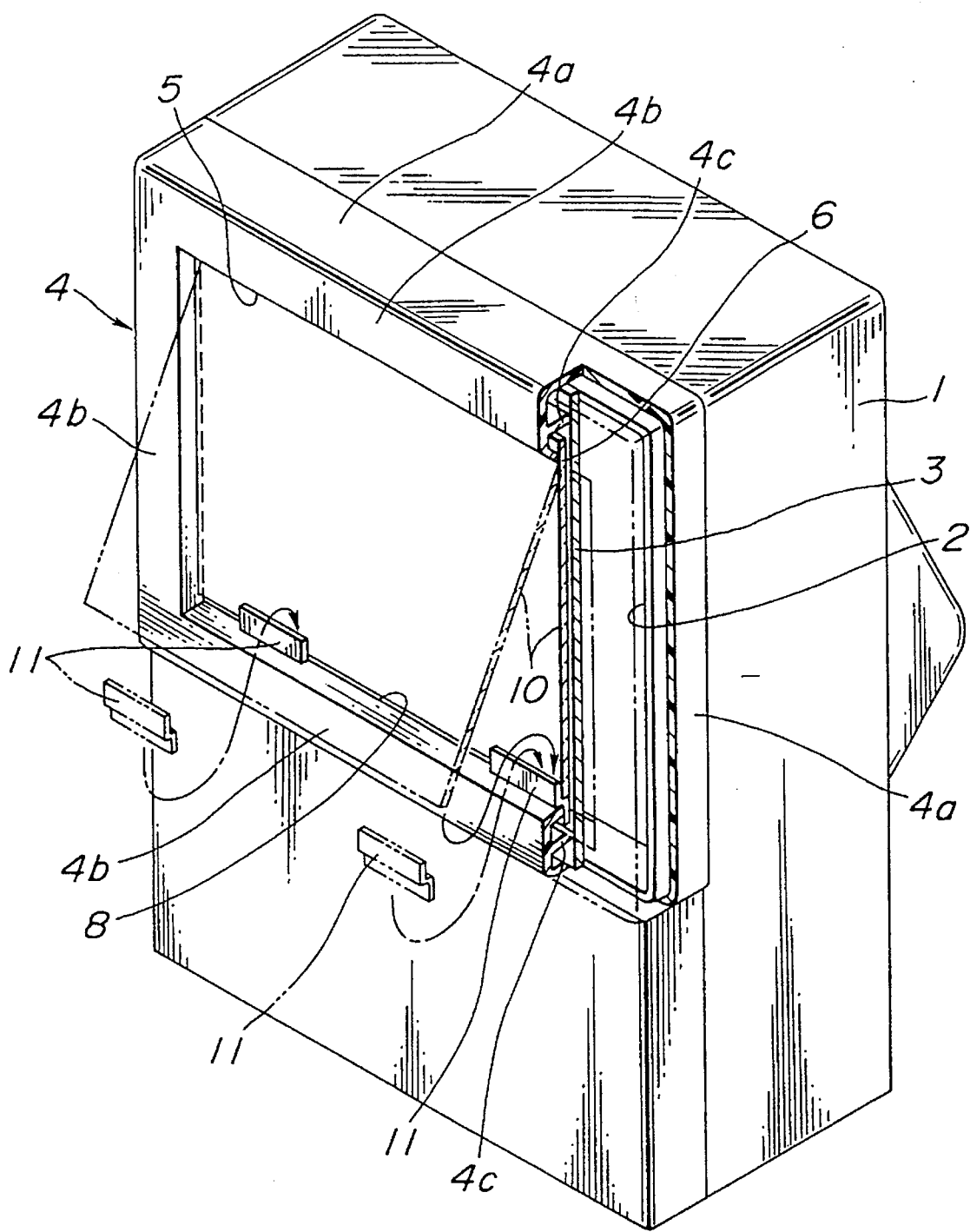
FIG. 1 is a perspective view of an image display device (viz; projection television) and protector screen arrangement illustrative of a first preferred embodiment of the invention.

Referring to FIG. 1, a perspective view of a housing 1 of an image display device incorporating a screen protection arrangement according to the invention is shown. The housing 1 mounts a CRT (not shown in the drawings, the CRT of to the present embodiment has been disclosed in Unexamined Japanese Patent Application No. 05-023095, assigned to the same assignee as present invention and hereby incorporated by reference).

As may be seen in the drawing, the screen protection arrangement comprises a screen frame 4, which frames a screen 3 of the image display device. The screen frame 4 includes an upper surface portion 4a and side facing portions 4b ... 4b) provided at upper lower, left and right sides of the screen frame 4 so as to define a frame opening 5. The dimensions of the frame opening 5 are established such that inner edges of the facing portions 4b overlap the outer periphery of the screen 3. It will be noted that the dimensions of the frame opening 5, widths and lengths of the facing portions 4b, size of the screen 3, etc., will vary depending on, for example, model and/or manufacturer.

Figure 4:
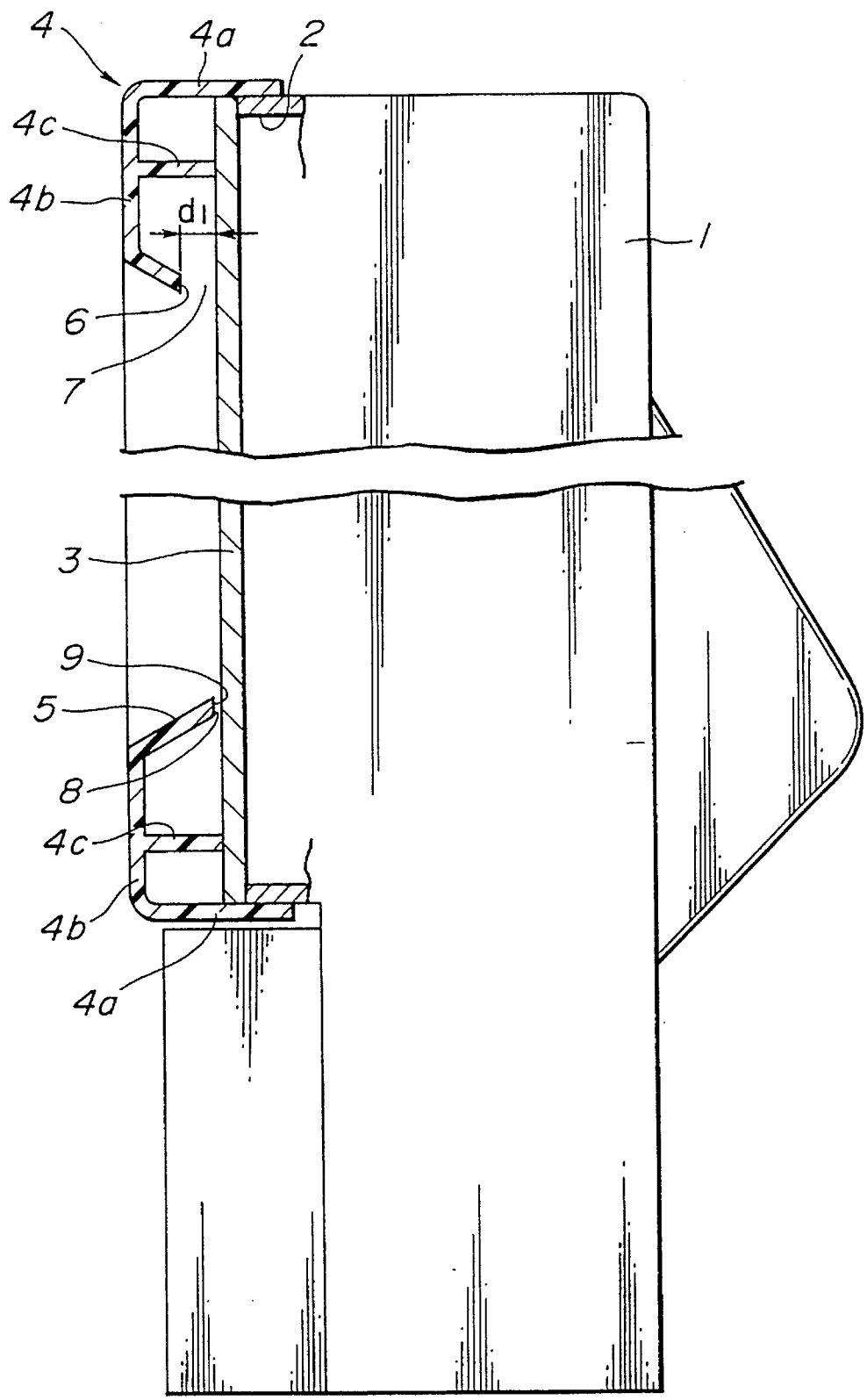
FIG. 4 is a cross-sectional view of the image display device of the first embodiment in a condition wherein the protector screen is not installed.

Referring now to FIG. 4, it may be seen that an inside upper frame opening surface 6 oriented substantially parallel to the screen 3 and is spaced therefrom by a predetermined distance d1 so as to allow access to an insertion space 7 defined in an upper side of the screen frame 4. Comparison of FIGS. 4 and 2 will show that the distance d1 is established so as to be larger than a distance d2 representative of a thickness of a protector screen 10 (i.e. 3–4 mm). Further, at a lower side of the screen frame 4 an inside lower frame opening surface 9, oriented substantially parallel to the screen 3 and is spaced therefrom by a third predetermined distance d3 (i.e 5 mm) to define an support gap 9. It will be noted that the distance d1 is also greater than the distance d3.

Figure 5:
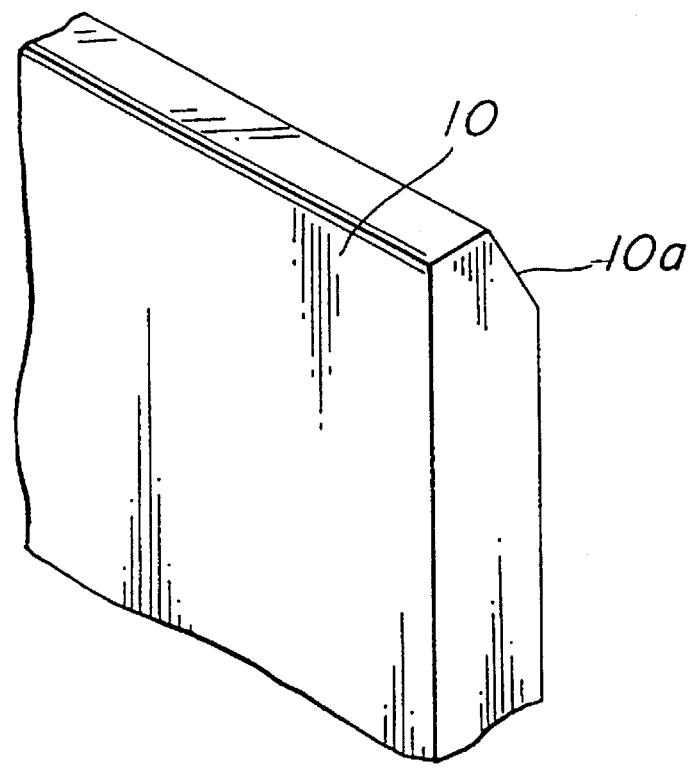
FIG. 5 is an enlarged perspective view showing construction of an edge portion of a protector screen according to the arrangement of the first embodiment.
Figure 6:
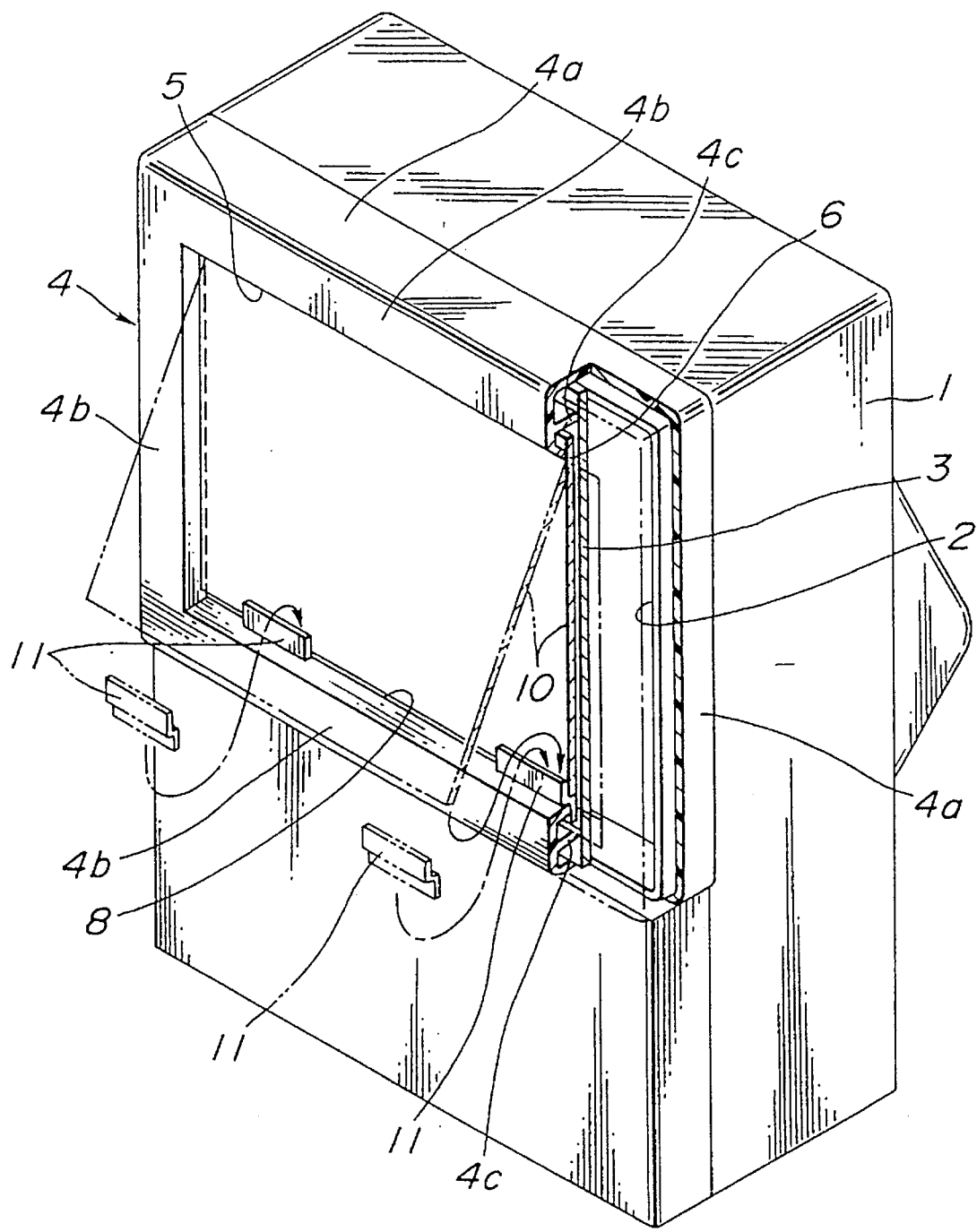
FIG. 6 is a perspective view of an image display device and protector screen arrangement illustrative of a second preferred embodiment of the invention.
Figure 7:
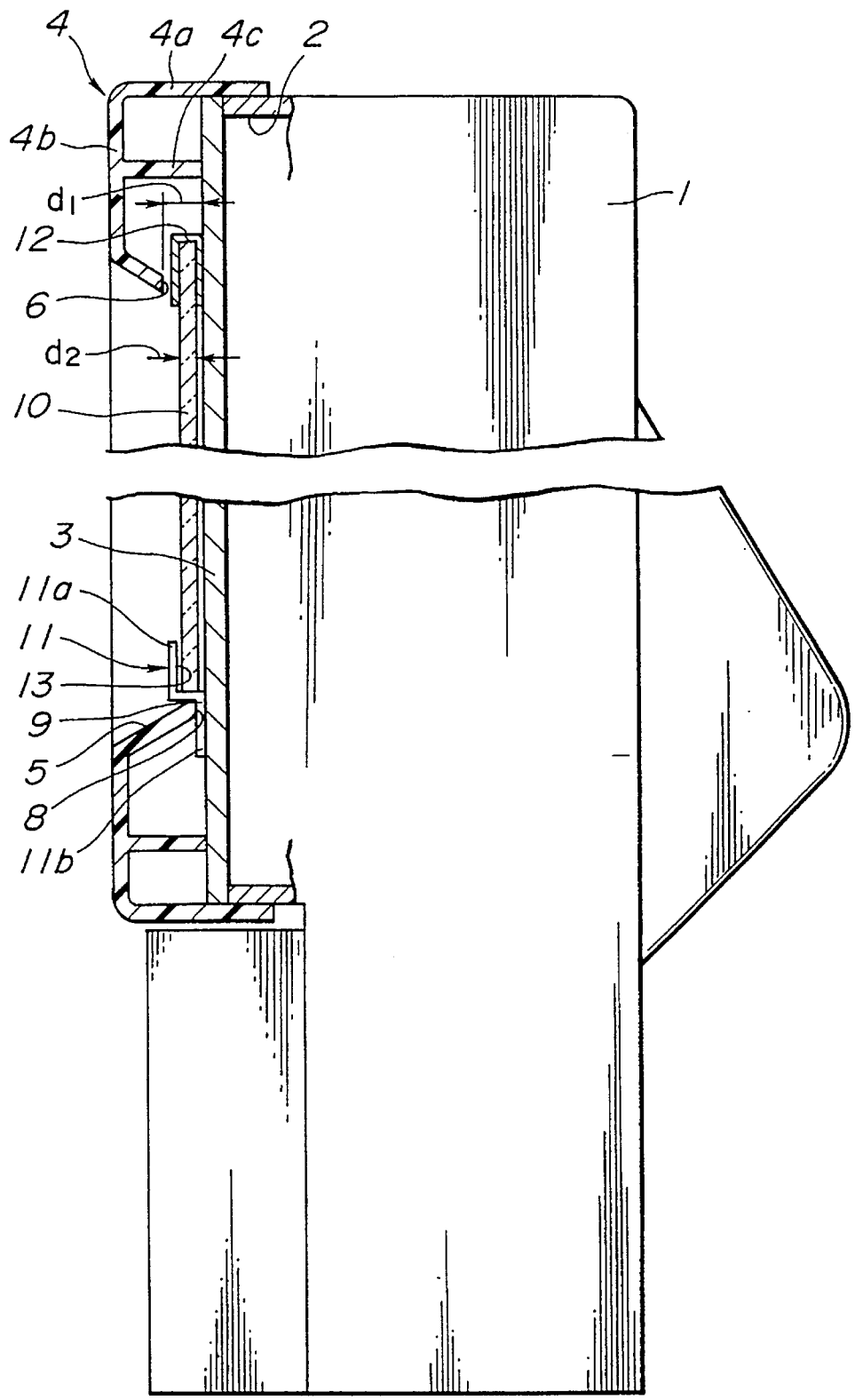
FIG. 7 shows a cross-sectional view of the image display device of FIG. 6.
Figure 8:
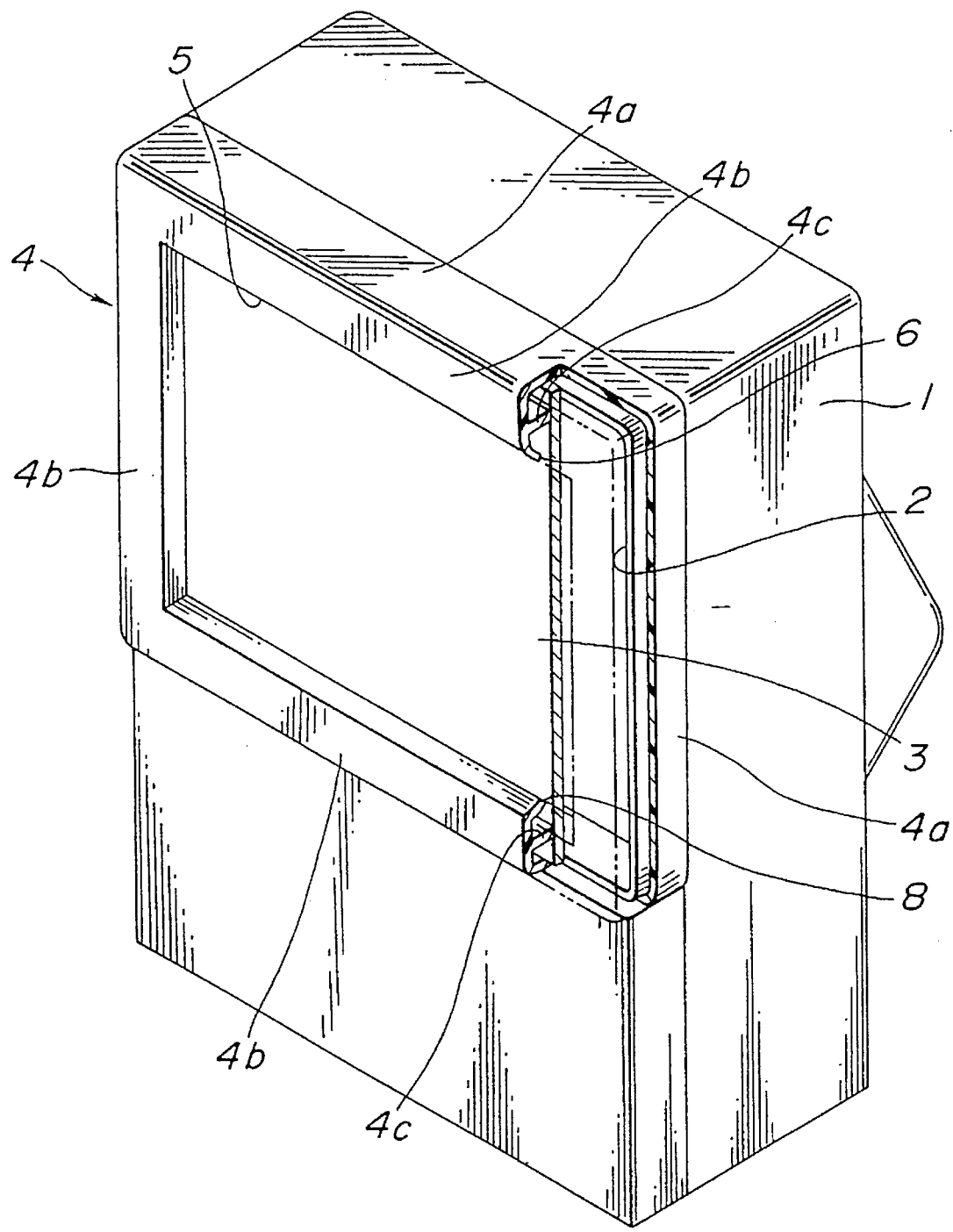
FIG. 8 is a partially cut-away perspective view of an image display device of the second embodiment in a condition wherein a protector thereof screen is not installed.
Figure 9:
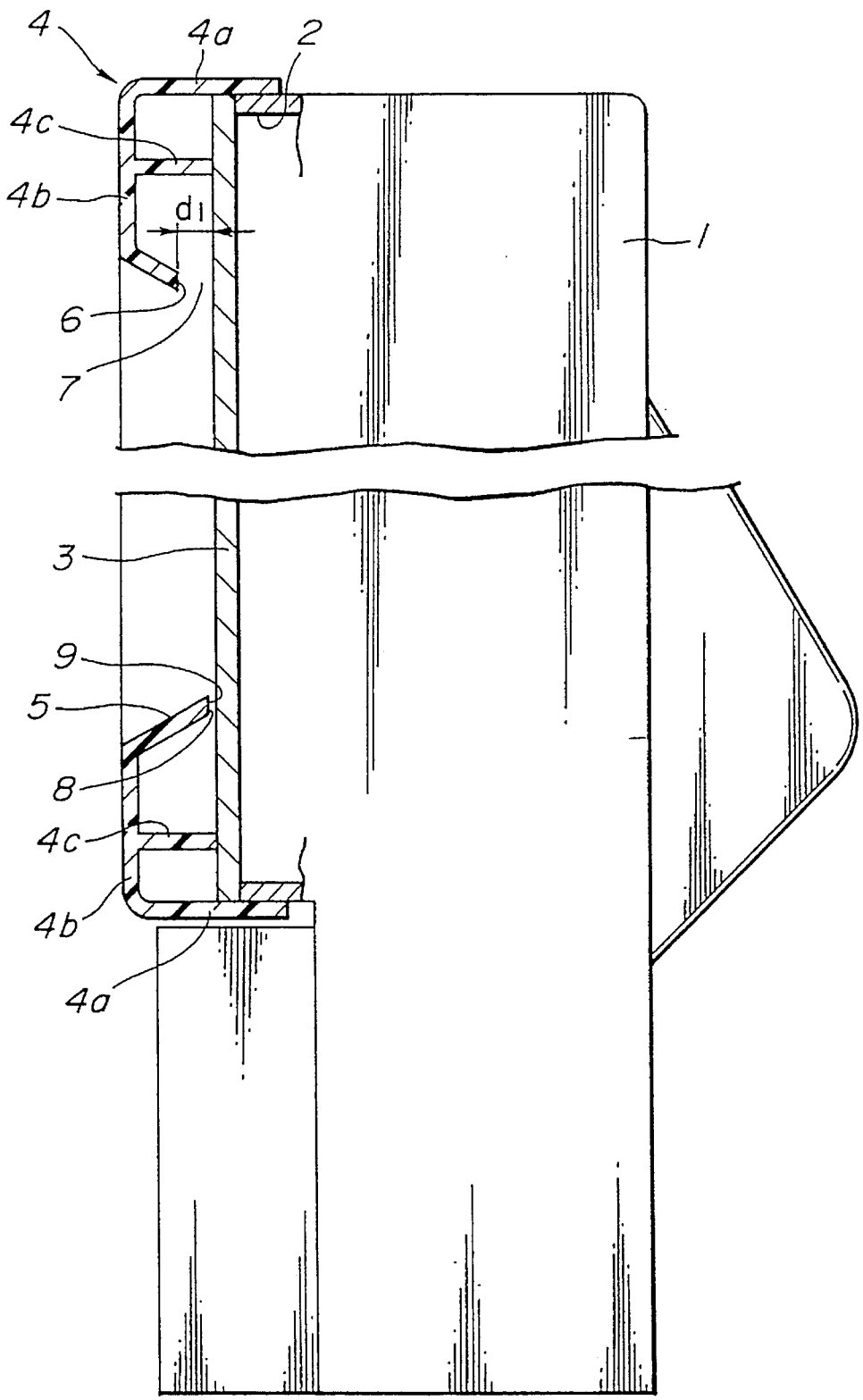
FIG. 9 is a cross-sectional view of the image display device of the second embodiment in a condition wherein the protector screen is not installed.
Figure 10:
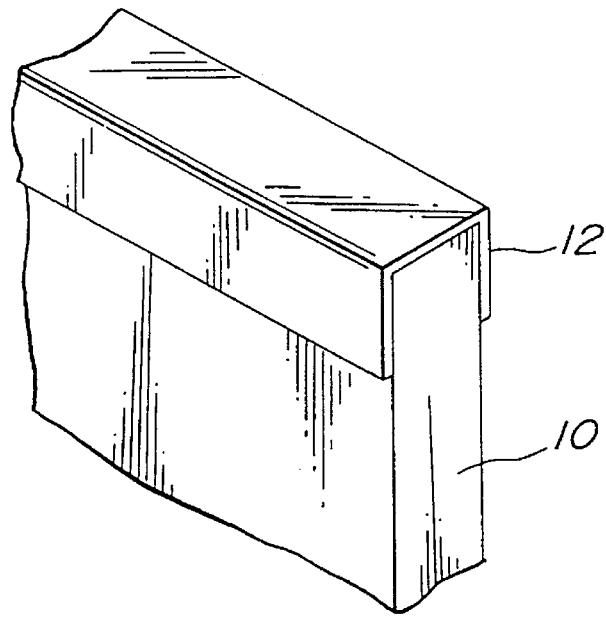
FIG. 10 is an enlarged perspective view showing a construction of an edge portion of a protector screen according to the second preferred embodiment.

According to the present embodiment, a vertical dimension of the protector screen 10 is formed to be greater than that of the frame opening 5. On the other hand, a horizontal, or width dimension of the protector screen is established to be substantially equal that of the frame opening 5. Referring now to FIG. 5 it will be noted that an insertion (viz; upper) edge portion 10a of the protector screen 10 includes a bevelled portion 10a therealong. The bevelled portion 10a is formed on the side of the upper edge which faces in the direction of the screen 3.

Figure 2:
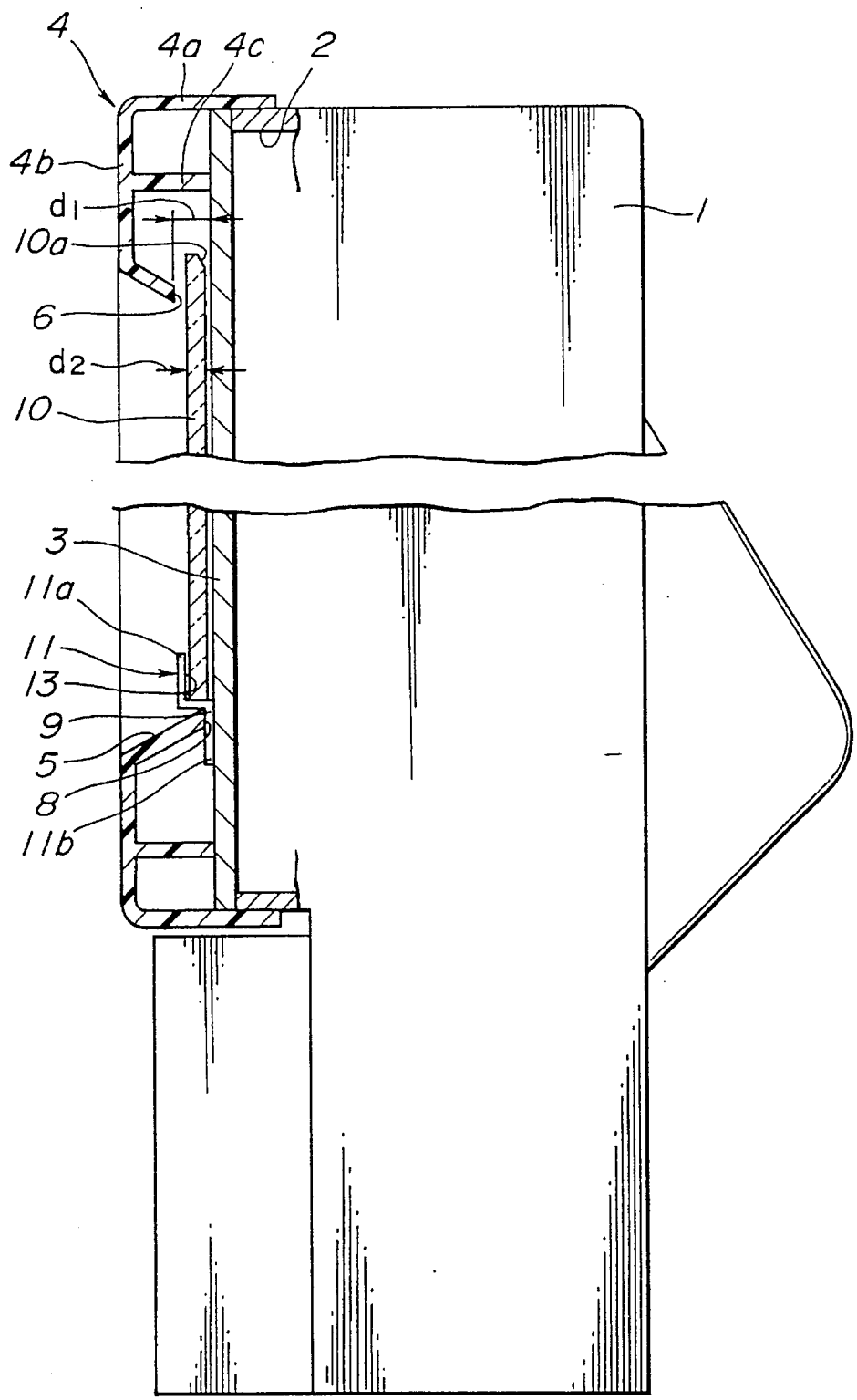
FIG. 2 shows a cross-sectional view of the image display device of FIG. 1.
Figure 3:
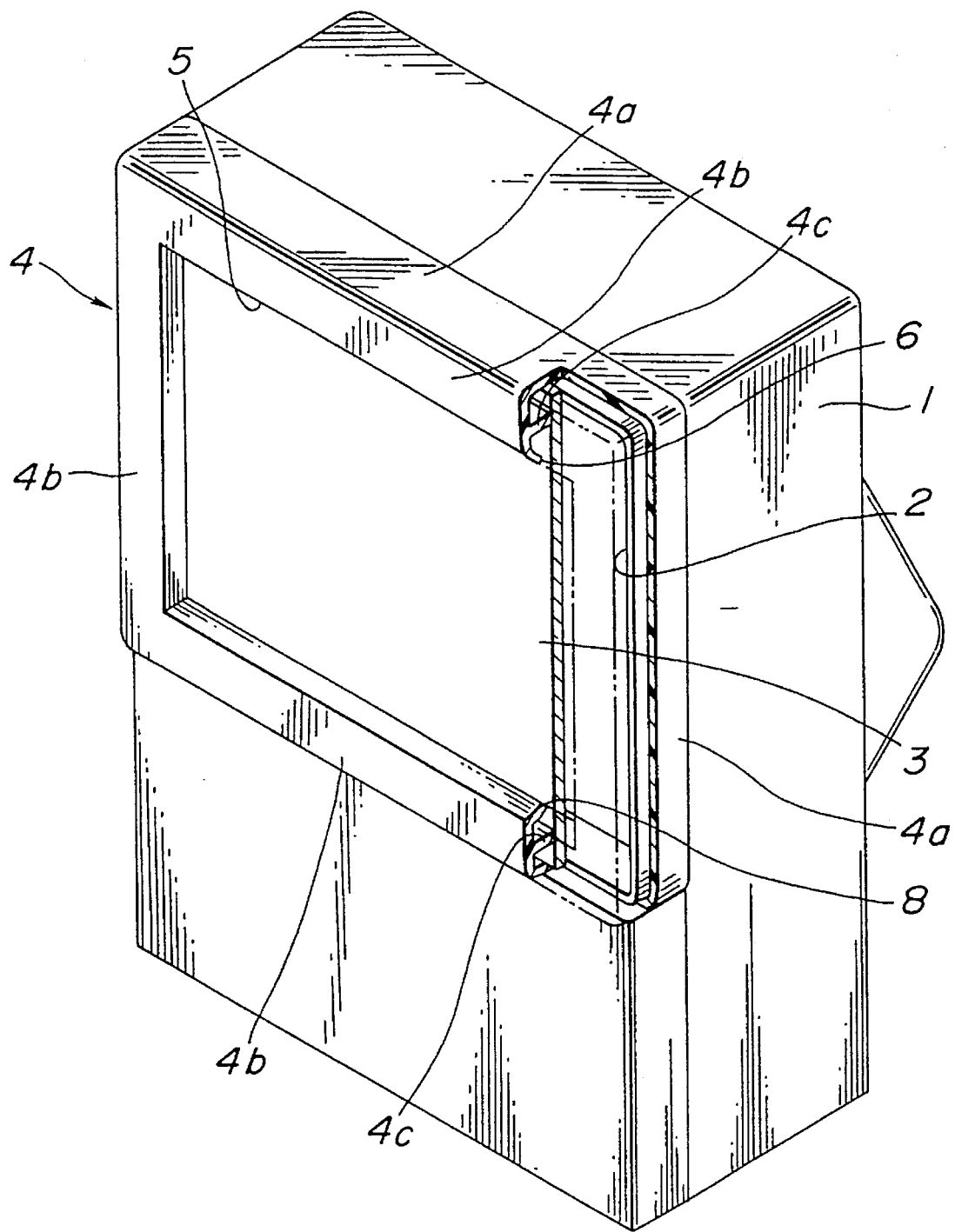
FIG. 3 is a partially cut-away perspective view of an image display device according to the first embodiment in a condition wherein a protector thereof screen is not installed.

As may be seen in FIGS. 1 and 2 at least one support base 11 is provided form mounting the protector screen 10. According to the present embodiment, the support base 11 is not attached to the image display device, but is formed as a separate component which may be easily inserted along a lower edge of the frame opening 5. That is a lower side 11b of the support base 11 is inserted to be disposed between the screen 3 and the lower frame opening surface 9 while the upper portion 11a of the support base 11 forms an inverse L-shaped shelf including an inner front wall 13. Thus, an upper side of the protector screen 10 may be easily accomodated in the insertion space 7 defined in the upper side of the screen frame 4.

For manually installing the protector screen 10, a lower side thereof may be lifted over the inner front wall 13 of the support base 11 to be received in the spaced defined between the support base 11 and the screen 3 along the lower edge of the frame opening 5. The curved broken line of FIG. 1 indicates the motion of an installation procedure of the support base 11 while a curved arrow indicates the motion of an installation procedure of the protector screen 10. It will be appreciated that provision the bevelled portion 10a on the top inner edge of the protector screen allows the protector screen 10 to be tilted outwardly by a substantial degree even when the upper side thereof is inserted into the insertion space 7. Thus manual installation or removal of the protector screen is greatly facilitated. According to the invention, ease of installation is further facilitated according to the predetermined proportional relationship established between the distances d1, d2 (vis; the width of the protector screen 10) and d3.

Further, it will be noted that the same protector screen 10 may be used on any image display device, subject only to compatibility of width dimensions of the frame opening 5 and the protector screen 10, irregardless of a size of the particular (image display) screen 3 installed in the device.

Hereinbelow, a second preferred embodiment of a screen protection arrangement according to the invention will be described with reference to FIGS. 6–10. It will be noted in connection with the description of the second embodiment that components corresponding to those of the above-described first embodiment will be referred to by like reference numbers.

As may be seen in the drawings, the screen frame 4 of the second embodiment is substantially identical to that of the first. The principal difference of the present embodiment is that an upper side of the protector screen 10 is not formed with a bevelled portion such as the bevelled portion 10a described in connection with the first embodiment. However, the front, back and upper sides of the upper edge of the screen protector 10 of the present embodiment are bordered by a tape strip 12, as may be seen in FIGS. 7 and 10. According to this, a cost of manufacturing the protector screen 10 is reduced since forming of a bevelled portion is not required. However, the predetermined proportional relationship between the distances d1, d2 and d3, of the present embodiment are established such that manual operation for mounting or removing the protector screen is still easily accomplished and the same advantages as the above-described first embodiment are obtained. However, contact frequently occurs between the upper side of the protector screen 10 and an upper area of the screen 3 according to repeated installation and/or removal operation. Thus, the upper edge of the protector screen 10 of the second embodiment is suitably protected by the tape strip 12, such that scratching, chipping, or other damage to either of the upper side of the protector screen 10 and/or the upper side of the screen 3 is reliably prevented.

It will be noted that the tape strip 12 may be formed of adhesive tape, a U-shaped member of synthetic resin, or the like.

Figure 11:
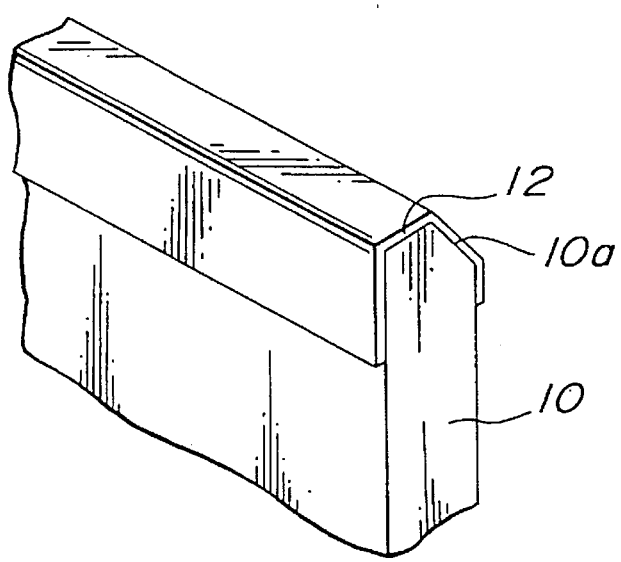
FIG. 11 shows an alternative construction of the edge portion of the protector screen according to the second embodiment.
Figure 12:
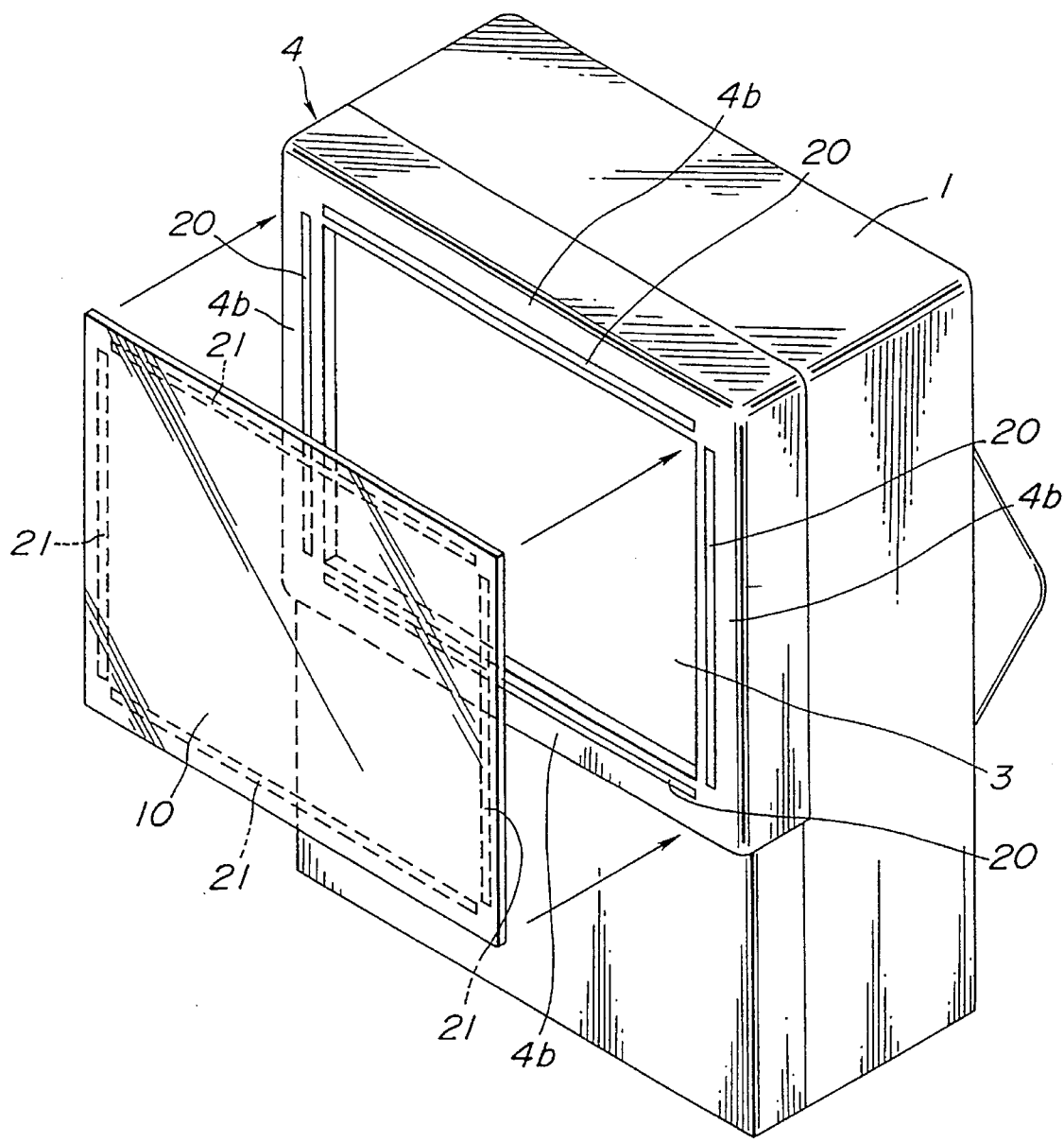
FIG. 12 is a perspective view of a conventional screen protection arrangement for a projection television as elaborated in the Description of the Related Art.

In regard to the above, FIG. 11 shows a modification of the above described embodiments characterized in that a protector screen 10 having a bevelled portion 10a as set forth in the first embodiment is additionally provided with a protective strip 12 for providing additional protection.

Thus according to the present invention an image display device including a screen protector which can be easily attached and removed with consistent positioning and attractive appearance is provided.

Also, a protector screen arrangement having a high degree of flexibility is disclosed in which, subject only to width compatibility between the protector screen 10 and the frame opening 5, the same protector screen 10 may be utilized and easily installed or removed from image display devices of various makes and models.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A method of installing a protector screen on an image display device, comprising the steps of:

installing a display screen in a wall portion of a housing;

attaching a screen frame to said housing so as to overlap peripheral edges of said display screen to define a frame opening bordering said display screen;

providing a base support portion on said image display device at a location corresponding to a lower edge of said screen frame so as to define a concave support groove along said lower edge of said screen frame;

upwardly inserting a protector screen, having a width dimension substantially equal to a width dimension of said frame opening and a vertical dimension greater than a vertical dimension of said frame opening into a clearance defined in an upper side of said screen frame, until a lower side of said protector screen is positioned above said base support portion; and fitting said lower side of said protector screen into said concave support groove.

2. An image display device incorporating screen protection means, comprising:

a device housing;

a display screen installed in a wall portion of said device housing;

a screen frame attached to said device housing so as to overlap peripheral edges of said display screen to define a frame opening bordering said display screen;

a base support portion provided on said image display device at a location corresponding to a lower edge of said screen frame, said base support portion defining a concave support groove along said lower edge of said screen frame; and a protector screen having a width dimension substantially equal to a width dimension of said frame opening and a vertical dimension greater than a vertical dimension of said frame opening; wherein:

a structure of said screen frame is established such that an insertion space is defined within an upper side of said screen frame and a gap is defined between facing surfaces of the upper side of said screen frame and a surface of said display screen; and wherein said insertion space having an upper clearance established such that said protector screen may be upwardly inserted thereinto to a point whereat a lower side of said protector screen achieves a position higher than a front wall of said base support portion.

3. An image display device incorporating screen protection means as set forth in claim 2, wherein an upper edge corner of said protector screen which faces said display screen is bevelled.

4. An image display device incorporating screen protection means as set forth in claim 2, wherein an upper edge of said protector screen is bordered by a protective strip member on all sides thereof.

5. An image display device incorporating screen protection means as set forth in claim 2, wherein said screen defines first peripheral dimensions and said frame opening defines second peripheral dimensions different from said first peripheral dimensions.

6. An image display device incorporating screen protection means as set forth in claim 2, wherein said base support portion is removably mountable on said image display device.

7. An image display device incorporating screen protection means as set forth in claim 2, wherein a width of said gap is established so as to allow said protector screen to be tilted in relation to a surface plane of said display screen while an upper portion thereof is inserted into said insertion space.

8. An image display device incorporating screen protection means as set forth in claim 2, wherein a predetermined proportional relationship is set between width dimensions of said gap and said support groove, said predetermined proportional relationship being established according to a thickness dimension of said protector screen.

* * * * *